United States Patent
Lakshmi Narayanan et al.

(10) Patent No.: US 11,195,030 B2
(45) Date of Patent: *Dec. 7, 2021

(54) SCENE CLASSIFICATION

(71) Applicant: Honda Motor Co., Ltd., Tokyo (JP)

(72) Inventors: Athmanarayanan Lakshmi Narayanan, Sunnyvale, CA (US); Isht Dwivedi, New York, NY (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 16/374,205

(22) Filed: Apr. 3, 2019

(65) Prior Publication Data

US 2020/0089969 A1    Mar. 19, 2020

Related U.S. Application Data

(60) Provisional application No. 62/731,158, filed on Sep. 14, 2018.

(51) Int. Cl.
  *G06K 9/00* (2006.01)
  *G06T 7/174* (2017.01)

(52) U.S. Cl.
  CPC ..... *G06K 9/00805* (2013.01); *G06K 9/00718* (2013.01); *G06K 9/00765* (2013.01);
  (Continued)

(58) Field of Classification Search
  CPC ........... G06K 9/00711; G06K 9/00718; G06K 9/00765; G06K 9/00771; G06K 9/00785;
  (Continued)

(56) References Cited

U.S. PATENT DOCUMENTS

2016/0267335 A1    9/2016 Hampiholi
2018/0056850 A1    3/2018 Schwaiger
(Continued)

FOREIGN PATENT DOCUMENTS

JP    2007329762    12/2007
JP    2014235605    12/2014
(Continued)

OTHER PUBLICATIONS

Office Action of U.S. Appl. No. 16/438,119 dated May 28, 2020, 28 pages.
(Continued)

*Primary Examiner* — Sean M Conner
*Assistant Examiner* — Stephen M Brinich
(74) *Attorney, Agent, or Firm* — Rankin, Hill & Clark LLP

(57) ABSTRACT

According to one aspect, scene classification may be provided. An image capture device may capture a series of image frames of an environment from a moving vehicle. A temporal classifier may classify image frames with temporal predictions and generate a series of image frames associated with respective temporal predictions based on a scene classification model. The temporal classifier may perform classification of image frames based on a convolutional neural network (CNN), a long short-term memory (LSTM) network, and a fully connected layer. The scene classifier may classify image frames based on a CNN, global average pooling, and a fully connected layer and generate an associated scene prediction based on the scene classification model and respective temporal predictions. A controller of a vehicle may activate or deactivate vehicle sensors or vehicle systems of the vehicle based on the scene prediction.

17 Claims, 8 Drawing Sheets

(52) U.S. Cl.
CPC .... *G06T 7/174* (2017.01); *G06T 2207/10028* (2013.01); *G06T 2207/20081* (2013.01); *G06T 2207/20084* (2013.01); *G06T 2207/30192* (2013.01); *G06T 2207/30261* (2013.01)

(58) Field of Classification Search
CPC ........... G06K 9/00805; G06K 9/00812; G06K 9/00798; G06K 9/00791; G06K 9/00362; G06T 7/174; G06T 2207/00; G06T 2207/10028; G06T 2207/20081; G06T 2207/20084; G06T 2207/30192; G06T 2207/30181; G06T 2207/30261; G06T 2207/30264; G06T 2207/30252
USPC ................. 382/155–159, 165, 170, 224–228
See application file for complete search history.

(56) References Cited

U.S. PATENT DOCUMENTS

| | | | |
|---|---|---|---|
| 2018/0122033 A1 | 5/2018 | Mayuzumi | |
| 2018/0165554 A1 | 6/2018 | Zhang et al. | |
| 2019/0012574 A1 | 1/2019 | Anthony et al. | |
| 2019/0065872 A1 | 2/2019 | Yamanaka et al. | |
| 2019/0228224 A1* | 7/2019 | Guo | G06K 9/0063 |
| 2019/0303682 A1 | 10/2019 | Trim et al. | |
| 2020/0079374 A1 | 3/2020 | Duan et al. | |
| 2020/0117959 A1* | 4/2020 | Sargent | G06K 9/685 |

FOREIGN PATENT DOCUMENTS

| | | |
|---|---|---|
| JP | 2018022234 | 2/2018 |
| JP | 2018066712 | 4/2018 |

OTHER PUBLICATIONS

Notice of Allowance of U.S. Appl. No. 16/438,119 dated Aug. 7, 2020, 10 pages.
G. Neuhold, T. Ollmann, S. R. Bulò, and P. Kontschieder, "The Mapillary Vistas Dataset for Semantic Understanding of Street Scenes," in ICCV, pp. 5000-5009, 2017.
Newcomb, D., "New Technology May Prevent Accidents by Reading Drivers' Body Language," https://www.forbes.com/sites/dougnewcomb/2015/04/22/new-technology-looks-inward-to-prevents-accidents-by-reading-drivers-body-language/#4a1c560d28b5.
J. Yue-Hei Ng, M. Hausknecht, S. Vijayanarasimhan, O. Vinyals, R. Monga, and G. Toderici, "Beyond short snippets: Deep networkds for video classification," in Proceedings of the IEEE conference on computer vision and pattern recognition, pp. 4694-4702, 2015.
Nuria Oliver and Alex Pentand. Graphical Models for Driver Behavior Recognition in a SmartCar. In IV, 2000.
A. Palazzi, D. Abati, S. Calderara, F. Solera, and R. Cucchiara, "Predicting the Driver's Focus of Attention: the DR(eye)VE Project," IEEE Transactions on Pattern Analysis and Machine Intelligence, 2018.
Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in PyTorch. In NIPS-W, 2017.
M. C. Potter and E. I. Levy, "Recognition memory for a rapid sequence of pictures," Journal of experimental psychology, vol. 81, No. 1, p. 10, 1969.
Siyuan Qi and Song-Chun Zhu. Intent-aware Multi-agent Reinfocement Learning. In ICRA, 2018.
Y. Qian, E. J. Almazan, and J. H. Elder, "Evaluating features and classifiers for road weather condition analysis," in Image Processing (ICIP), 2016 IEEE International Conference on, pp. 4403-4407, IEEE, 2016.
"Autonomous driving: how good is LiDAR under heavy rain or fog?," Quora. https://www.quora.com/Autonomous-driving-how-good-is-LiDAR-under-heavy-rain-or-fog.
V. Ramanishka, Y.-T. Chen, T. Misu, and K. Saenko, "Toward driving scene understanding: A dataset for learning driver behavior and causal reasoning," in Proceedings of the IEEE Conference on Computer Vision and Pattern Recognition, pp. 7699-7707, 2018.
M. Schmidt. U. Hofmann, and M. Bouzouraa. A Novel Goal Oriented Concept for Situation Representation for ADAS and Automated Driving. In ITSC, 2014.
H. G. Seif and X. Hu, "Autonomous driving in the iCityHD maps as a key challenge of the automotive industry," Engineering, vol. 2, No. 2, pp. 159-162, 2016.
R. R. Selvaraju, M. Cogswell, A. Das, R. Vedantam, D. Parikh, and D. Batra, "Grad-cam: Visual explanations from deep networks via gradient-based localization," in ICCV, pp. 618-626, 2017.
"Lidar Vs Radar for Applied Autonomy," Semcon. https://semcon.com/what-we-do/applied-autonomy/lidar-vs-radar-for-applied-autonomy/.
Zheng Shou, Junting Pan, Jonathan Chan, Kazuyuki Miyazawa, Hassan Mansour, Anthony Vetro, Xavier Giro-i Nieto, and Shih-Fu Chang. Online Action Detection in Untrimmed, Streaming Videos—Modeling and Evaluation. arXiv:1802.06822, 2018.
N. Shroff, P. Turaga, and R. Chellappa, "Moving vistas: Exploiting motion for describing scenes," in Computer Vision and Pattern Recognition (CVPR), 2010 IEEE Conference on, pp. 1911-1918, IEEE, 2010.
I. Sikirić, K. Brkić, J. Krapac, and S. Šegvić, "Image representations on a budget: Traffic scene classification in a restricted bandwidth scenario," in 2014 IEEE Intelligent Vehicles Symposium Proceedings, pp. 845-852, IEEE, 2014.
Christian Szegedy, Sergey Ioffe, and Vincent Vanhoucke. Inception-v4, Inception-ResNet and the Impact of Residual Connections on Learning. CoRR, 2016.
D. Tran, L. Bourdev, R. Fergus, L. Torresani, and M. Paluri, "Learning spatiotemporal features with 3d convolutional networks," in Proceedings of the IEEE international conference on computer vision, pp. 4489-4497, 2015.
D. Tran, H. Wang, L. Torresani, J. Ray, Y. LeCun, and M. Paluri, "A Closer Look at Spatiotemporal Convolutions for Action Recognition," in CVPR, 2018.
Chien-Yi Wang, Athma Narayanan, Abhisek Patil, and Yi-Ting Chen. A 3D Dynamic Scene Analysis framework for Development of Intelligent Transportation Systems. In IV, 2018.
L. Wang, S. Guo, W. Huang, Y. Xiong, and Y. Qiao, "Knowledge guided disambiguation for large-scale scene classification with multiresolution CNNs," IEEE Transactions on Image Processing, vol. 26, No. 4, pp. 2055-2068, 2017.
F.-Y. Wu, S.-Y. Yan, J. S. Smith, and B.-L. Zhang, "Traffic scene recognition based on deep CNN and VLAD spatial pyramids," in Machine Learning and Cybernetics (ICMLC), 2017 International Conference on, vol. 1, pp. 156-161, IEEE, 2017.
H. Xu, A. Das, and K. Saenko, "R-C3D: region convolutional 3d network for temporal activity detection," in IEEE Int. Conf. on Computer Vision (ICCV), pp. 5794-5803, 2017.
H. Xu, Y. Gao, F. Yu, and T. Darrell, "End-to-end learning of driving models from large-scale video datasets," arXiv preprint, 2017.
J. Yao, S. Fidler, and R. Urtasun, "Describing the scene as a whole: Joint object detection, scene classification and semantic segmentation," in Computer Vision and Pattern Recognition (CVPR), 2012 IEEE Conference on, pp. 702-709, IEEE, 2012.
F. Yu, A. Seff, Y. Zhang, S. Song, T. Funkhouser, and J. Xiao, "Lsun: Construction of a large-scale image dataset using deep learning with humans in the loop," arXiv preprint arXiv:1506.03365, 2015.
F. Yu, W. Xian, Y. Chen, F. Liu, M. Liao, V. Madhavan, and T. Darrell, "Bdd100k: A diverse driving video database with scalable annotation tooling," arXiv preprint arXiv:1805.04687, 2018.
Wei Zhan, Changliu Liu, Ching-Yao Chan, and Masayoshi Tomizuka. A Non-conservatively Defensive Strategy for Urban Autonomous Driving. In ITSC, 2016.
J. Zhang, S. A. Bargal, Z. Lin, J. Brandt, X. Shen, and S. Sclaroff, "Top-down neural attention by excitation backprop," International Journal of Computer Vision, vol. 126, No. 10, pp. 1084-1102, 2018.
B. Zhou, A. Khosla, A. Lapedriza, A. Oliva, and A. Torralba, "Learning deep features for discriminative localization," in Pro-

(56) References Cited

OTHER PUBLICATIONS ceedings of the IEEE Conference on Computer Vision and Pattern Recognition, pp. 2921-2929, 2016.
B. Zhou, A. Lapedriza, A. Khosla, A. Oliva, and A. Torralba, "Places: A 10 million image database for scene recognition," IEEE transactions on pattern analysis and machine intelligence, 2017.
Tinghui Zhou, Matthew Brown, Noah Snavely, and David G. Lowe. Unsupervised Learning of Depth and Ego-Motion from Video. In CVPR, 2017.
Office Acton of U.S. Appl. No. 16/132,950 dated Jul. 10, 2019, 22 pages.
Notice of Allowance of U.S. Appl. No. 16/132,950 dated Sep. 11, 2019, 16 pages.
Office Action of U.S. Appl. No. 16/438,365 dated Nov. 13, 2020, 41 pages.
Notice of Allowance of U.S. Appl. No. 16/438,365 dated Feb. 18, 2021, 22 pages.
Pulkit Agrawal, Joao Carreira, and Jitendra Malik. Learning to See by Moving. In ICCV; 2015.
Ioan Andrei Barsan, Peidong Liu, Marc Pollefeys, and Andreas Geiger. Robust Dense Mapping for Large-Scale Dynamic Environments. In ICRA, 2018.
Bijelic, M., Mannan, F., Gruber, T., Ritter, W., Dietmayer, K., Heide, F., "Seeing Through Fog Without Seeing Fog: Deep Sensor Fusion in the Absence of Labeled Training Data," arXiv:1902.08913v1, Feb. 24, 2019. https://arxiv.org/pdf/1902.08913.pdf.
A. Bolovinou, C. Kotsiourou, and A. Amditis, "Dynamic road scene classification: Combining motion with a visual vocabulary model," in Information Fusion (FUSION), 2013 16th International Conference on, pp. 1151-1158, IEEE, 2013.
H. Brugman, A. Russel, and X. Nijmegen, "Annotating Multimedia/Multi-modal Resources with ELAN," in LREC, 2004.
Y.-W. Chao, S. Vijayanarasimhan, B. Seybold, D. A. Ross, J. Deng, and R. Sukthankar, "Rethinking the Faster R-CNN Architecture for Temporal Action Localization," in Proceedings of the IEEE Conference on Computer Vision and Pattern Recognition, pp. 1130-1139, 2018.
L.-C. Chen, G. Papandreou, I. Kokkinos, K. Murphy, and A. L. Yuille, "Deeplab: Semantic image segmentation with deep convolutional nets, atrous convolution, and fully connected crfs," IEEE transactions on pattern analysis and machine intelligence, vol. 40, No. 4, pp. 834-848, 2018.
Y. Chen, J. Wang, J. Li, C. Lu, Z. Luo, H. Xue, and C. Wang, "LiDAR—Video Driving Dataset: Learning Driving Policies Effectively," in Proceedings of the IEEE Conference on Computer Vision and Pattern Recognition, pp. 5870-5878, 2018.
M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proceedings of the IEEE conference on computer vision and pattern recognition, pp. 3213-3223, 2016.
Roeland De Geest, Efstratios Gavves, Amir Ghodrati, Zhenyang Li, Cees Snoek, and Tinne Tuytelaars. Online Action Detection. In ECCV, 2016.
J. Deng, W. Dong, R. Socher, L.-J. Li, K. Li, and L. Fei-Fei, "Imagenet: A large-scale hierarchical image database," in Computer Vision and Pattern Recognition, 2009. CVPR 2009. IEEE Conference on, pp. 248-255, Ieee, 2009.
Nachiket Deo and Mohan Trivedi. Learning and Predicting On-road Pedestrian Behavior Around Vehicles. In ITSC, 2017.
Anup Doshi and Mohan M. Trivedi. Tactical Driver Behavior Prediction and Intent Inference: A Review. In ITSC, 2011.
Kiana Ehsani, Hessam Bagherinezhad, Joseph Redmon, Roozbeh Mottaghi, and Ali Farhadi. Who Let The Dogs Out? Modeling Dog Behavior From Visual Data. CVPR, 2018.
C. Feichtenhofer, A. Pinz, and R. P. Wildes, "Dynamic scene recognition with complementary spatiotemporal features," IEEE transactions on pattern analysis and machine intelligence, vol. 38, No. 12, pp. 2389-2401, 2016.
C. Feichtenhofer, A. Pinz, and A. Zisserman, "Convolutional two-stream network fusion for video action recognition," in Proceedings of the IEEE Conference on Computer Vision and Pattern Recognition, pp. 1933-1941, 2016.
G. Floros, B. van der Zander, and B. Leibe, "Openstreetslam: Global vehicle localization using openstreetmaps," in ICRA, vol. 13, pp. 1054-1059, 2013.
S. Garg, N. Suenderhauf, and M. Milford, "Don't Look Back: Robustifying Place Categorization for Viewpoint- and Condition-Invariant Place Recognition," in IEEE International Conference on Robotics and Automation (ICRA), 2018.
A. Geiger, P. Lenz, and R. Urtasun, "Are we ready for autonomous driving? the kitti vision benchmark suite," in Computer Vision and Pattern Recognition (CVPR), 2012 IEEE Conference on, pp. 3354-3361, IEEE, 2012.
Caner Hazirbas, Lingni Ma, Csaba Domokos, and Daniel Cremers. FuseNet: Incorporating Depth into Semantic Segmentation via Fusion-based CNN Architecture. In ACCV, 2016.
He, Kaiming; Zhang, Xiangyu; Ren, Shaoqing; and Sun, Jian, "Deep residual learning for image recognition," in Proceedings of the IEEE conference on computer vision and pattern recognition, pp. 770-778, 2016.
Held and Hein, "Movement-produced stimulation in the development of visually guided behavior," Journal of comparative and physiological phychology, 1963.
S. Hochreiter and J. Schmidhuber, "Long short-term memory," Neural computation, vol. 9, No. 8, pp. 1735-1780, 1997.
J. Hu, L. Shen, and G. Sun, "Squeeze-and-excitation networks," arXiv preprint arXiv:1709.01507, vol. 7, 2017.
X. Huang, X. Cheng, Q. Geng, B. Cao, D. Zhou, P. Wang, Y. Lin, and R. Yang, "The apolloscape dataset for autonomous driving," arXiv preprint arXiv:1803.06184, 2018.
"The Ultimate Sensor Battle: Lidar vs. Radar," Intellias—Intelligent Software Engineering, Aug. 9, 2018. https://www.intellias.com/the-ultimate-sensor-battle-lidar-vs-radar/.
A. Jain, H. S. Koppula, B. Raghavan, S. Soh, and A. Saxena, "Car that knows before you do: Anticipating maneuvers via learning temporal driving models," in Proceedings of the IEEE International Conference on Computer Vision, pp. 3182-3190, 2015.
Ashesh Jain, Amir R. Zamir, Silvio Savarese, and Ashutosh Saxena. Structural-RNN: Deep Learning on Spatio-Temporal Graphs. In CVPR, 2016.
Dinesh Jayaraman and Kristen Grauman. Learning Image Representations Tied to Ego-motion. In ICCV, 2015.
P. Jonsson, "Road condition discrimination using weather data and camera images," in Intelligent Transportation Systems (ITSC), 2011 14th International IEEE Conference on, pp. 1616-1621, IEEE, 2011.
P. Jonsson, J. Casselgren, and B. Thörnberg, "Road surface status classification using spectral analysis of NIR camera images," IEEE Sensors Journal, vol. 15, No. 3, pp. 1641-1656, 2015.
A. Karpathy, G. Toderici, S. Shetty, T. Leung, R. Sukthankar, and L. Fei-Fei, "Large-scale video classification with convolutional neural networks," in Proceedings of the IEEE conference on Computer Vision and Pattern Recognition, pp. 1725-1732, 2014.
Diederik Kingma and Jimmy Ba. Adam: A Method for Stochastic Optimization. In ICLR, 2014.
Alex Krizhevsky and Sutskever, Ilya and Hinton, Geoffrey E, "Imagenet classification with deep convolutional neural networks," in Advances in Neural Information Processing Systems 25 (F. Pereira, C. J. C. Burges, L. Bottou, and K. Q. Weinberger, eds.), pp. 1097-1105, Curran Associates, Inc., 2012.
Namhoon Lee, Wongun Choi, Paul Vernaza, Chistopher B. Choy, Philip H. S. Torr, and Manmohan Chandraker. Desire: Distant Future Prediction in Dynamic Scenes with Interacting Agents. In CVPR, 2017.
J. Levinson, M. Montemerlo, and S. Thrun, "Map-Based Precision Vehicle Localization in Urban Environments," in Robotics: Science and Systems, vol. 4, p. 1, Citeseer, 2007.
F.F. Li, R. VanRullen, C. Koch, and P. Perona, "Rapid natural scene categorization in the near absence of attention," Proceedings of the National Academy of Sciences, vol. 99, No. 14, pp. 9596-9601, 2002.

(56) References Cited

OTHER PUBLICATIONS

Ruiyu Li, Makarand Tapaswi, Renjie Liao, Jiaya Jia, Raquel Urtasun, and Sanja Fidler. Situation Recognition with Graph Neural Networks. In ICCV, 2017.

X. Li, Z. Wang, and X. Lu, "A Multi-Task Framework for Weather Recognition," in Proceedings of the 2017 ACM on Multimedia Conference, pp. 1318-1326, ACM, 2017.

D. Lin, C. Lu, H. Huang, and J. Jia, "RSCM: Region Selection and Concurrency Model for Multi-Class Weather Recognition," IEEE Transactions on Image Processing, vol. 26, No. 9, pp. 4154-4167, 2017.

T.-Y. Lin, M. Maire, S. Belongie, J. Hays, P. Perona, D. Ramanan, P. Dollár, and C. L. Zitnick, "Microsoft coco. Common objects in context," in European conference on computer vision, pp. 740-755, Springer, 2014.

Tsung-Yi Lin, Piotr Dollar, Ross Girshick, Kaiming He, Bharath Hariharan, and Serge Belongie. Feature Pyramid Networks for Object Detection. In CVPR, 2017.

Tsung-Yi Lin, Priya Goyal, Ross Girshick, Kaiming He, and Piotr Dollar. Focal Loss for Dense Object Detection. In ICCV, 2017.

Shugao Ma, Leonid Sigal, and Stan Sclaroff. Learning Activity Progression in LSTMs for Activity Detection and Early Detection. In CVPR, 2016.

W. Maddem, G. Pascoe, C. Linegar, and P. Newman, "1 year, 1000 km: The oxford robotcar dataset," The International Journal of Robotics Research, vol. 36, No. 1, pp. 3-15, 2017.

V. Madhavan and T. Darrell, The BDD-Nexar Collective: A Large-Scale, Crowsourced, Dataset of Driving Scenes. PhD thesis, Masters thesis, EECS Department, University of California, Berkeley, 2017.

Marmanis, Dimitrios; Wegner, Jan D; Galliani, Silvano; Schindler, Konrad; Datcu, Mihai; and Stilla, Uwe, "Semantic segmentation of aerial images with an ensemble of CNNs," ISPRS Annals of the Photogrammetry, Remote Sensing and Spatial Information Sciences, vol. 3, p. 473, 2016.

J. A. Montoya-Zegarra, J. D. Wegner, L. Ladický, and K. Schindler, "Semantic segmentation of aerial images in urban areas with class-specific higher-order cliques," ISPRS Annals of the Photogrammetry, Remote Sensing and Spatial Information Sciences, vol. 2, No. 3, p. 127, 2015.

Katsuyuki Nakamaura, Serena Yeung, Alexandre Alahi, and Li Fei-Fei. Jointly Learning Energy Expenditures and Activities using Egocentric Multimodal Signals. In CVPR, 2017.

Ann Neal. "LiDAR vs. Radar," Sensors Online, Apr. 24, 2018. https://www.sensorsmag.com/components/lidar-vs-radar.

* cited by examiner

SCENE CLASSIFICATION

CROSS-REFERENCE TO RELATED APPLICATIONS

This application claims the benefit of U.S. Provisional Patent Application, Ser. No. 62/731,158, filed on Sep. 14, 2018; the entirety of the above-noted application(s) is incorporated by reference herein.

BACKGROUND

In driving scenarios, scene understanding by a human involves answering questions about a place, environmental conditions, and traffic participant behavior. Interestingly, humans are able to perform dynamic scene recognition rapidly and accurately with little attention to objects in the scene. Human drivers have the remarkable ability to classify complex traffic scenes and adapt their driving behavior based on their environment. In this regard, automated human level dynamic scene recognition may thus be an attractive goal to achieve.

BRIEF DESCRIPTION

According to one aspect, a system for scene classification may include an image capture device, an image segmentation module, an image masker, a temporal classifier, and a scene classifier. The image capture device may capture a first series of image frames of an environment from a moving vehicle. The image segmentation module may identify one or more traffic participants within the environment based on a first convolutional neural network (CNN). The image masker may generate a second series of image frames by masking one or more of the traffic participants from the environment. The temporal classifier may classify one or more image frames of the second series of image frames with one of two or more temporal predictions and generate a third series of image frames associated with respective temporal predictions based on a scene classification model. The temporal classifier may perform classification based on a second CNN, a long short-term memory (LSTM) network, and a first fully connected layer. The scene classifier may classify one or more image frames of the third series of image frames based on a third CNN, global average pooling, and a second fully connected layer and generate an associated scene prediction based on the scene classification model and respective temporal predictions.

The two or more temporal predictions may include an approaching annotation, an entering annotation, and a passing annotation. The first CNN, the second CNN, or the third CNN may be a deepnet CNN or a ResNet 50 CNN. The system for scene classification may be implemented in a vehicle and the vehicle may include a controller activating or deactivating one or more sensors or one or more vehicle systems of the vehicle based on the scene prediction.

The scene classifier may classify one or more image frames of the third series of image frames with a weather classification including clear, sunny, snowy, rainy, overcast, or foggy and the controller may activate or deactivate one or more of the sensors or one or more of the vehicle systems of the vehicle based on the weather classification. The scene classifier may classify one or more image frames of the third series of image frames with a road surface classification including dry, wet, or snow and the controller may activate or deactivate one or more of the sensors or one or more of the vehicle systems of the vehicle based on the road surface classification. The scene classifier may classify one or more image frames of the third series of image frames with an environment classification including urban, ramp, highway, or local and the controller may activate or deactivate one or more of the sensors or one or more of the vehicle systems of the vehicle based on the environment classification.

One or more of the vehicle systems may be a LIDAR system or radar system. The controller may deactivate the LIDAR system or radar system based on the scene prediction being a tunnel. The controller may prioritize searching for traffic lights, stop signs, stop lines based on the scene prediction being an intersection.

According to one aspect, a vehicle equipped with a system for scene classification may include an image capture device, an image segmentation module, an image masker, a temporal classifier, a scene classifier, and a controller. The image capture device may capture a first series of image frames of an environment from a moving vehicle. The image segmentation module may identify one or more traffic participants within the environment based on a first convolutional neural network (CNN). The image masker may generate a second series of image frames by masking one or more of the traffic participants from the environment. The temporal classifier may classify one or more image frames of the second series of image frames with one of two or more temporal predictions and generate a third series of image frames associated with respective temporal predictions based on a scene classification model. The temporal classifier may perform classification based on a second CNN, a long short-term memory (LSTM) network, and a first fully connected layer. The scene classifier may classify one or more image frames of the third series of image frames based on a third CNN, global average pooling, and a second fully connected layer and generate an associated scene prediction based on the scene classification model and respective temporal predictions. The controller may activate or deactivate one or more sensors or one or more vehicle systems of the vehicle based on the scene prediction.

The two or more temporal predictions may include an approaching annotation, an entering annotation, and a passing annotation. The first CNN, the second CNN, or the third CNN may be a deepnet CNN or a ResNet 50 CNN. One or more of the vehicle systems may be a LIDAR system or radar system and the controller may deactivate the LIDAR system or radar system based on the scene prediction being a tunnel.

According to one aspect, a system for scene classification may include an image capture device, a temporal classifier, and a scene classifier. The image capture device may capture a first series of image frames of an environment from a moving vehicle. The temporal classifier may classify one or more image frames of the first series of image frames with one of two or more temporal predictions and generate a second series of image frames associated with respective temporal predictions based on a scene classification model. The temporal classifier may perform classification based on a convolutional neural network (CNN), a long short-term memory (LSTM) network, and a first fully connected layer. The scene classifier may classify one or more image frames of the second series of image frames based on a second CNN, global average pooling, and a second fully connected layer and generate an associated scene prediction based on the scene classification model and respective temporal predictions.

The two or more temporal predictions may include an approaching annotation, an entering annotation, and a passing annotation. The CNN or the second CNN may be a ResNet 50 CNN. The system for scene classification may be implemented in a vehicle and the vehicle may include a controller activating or deactivating one or more sensors or one or more vehicle systems of the vehicle based on the scene prediction.

The scene classifier may classify one or more image frames of the third series of image frames with a weather classification including clear, sunny, snowy, rainy, overcast, or foggy. The controller may activate or deactivate one or more of the sensors or one or more of the vehicle systems of the vehicle based on the weather classification. The scene classifier may classify one or more image frames of the third series of image frames with a road surface classification including dry, wet, or snow. The controller may activate or deactivate one or more of the sensors or one or more of the vehicle systems of the vehicle based on the road surface classification.

DETAILED DESCRIPTION

Figure 1:
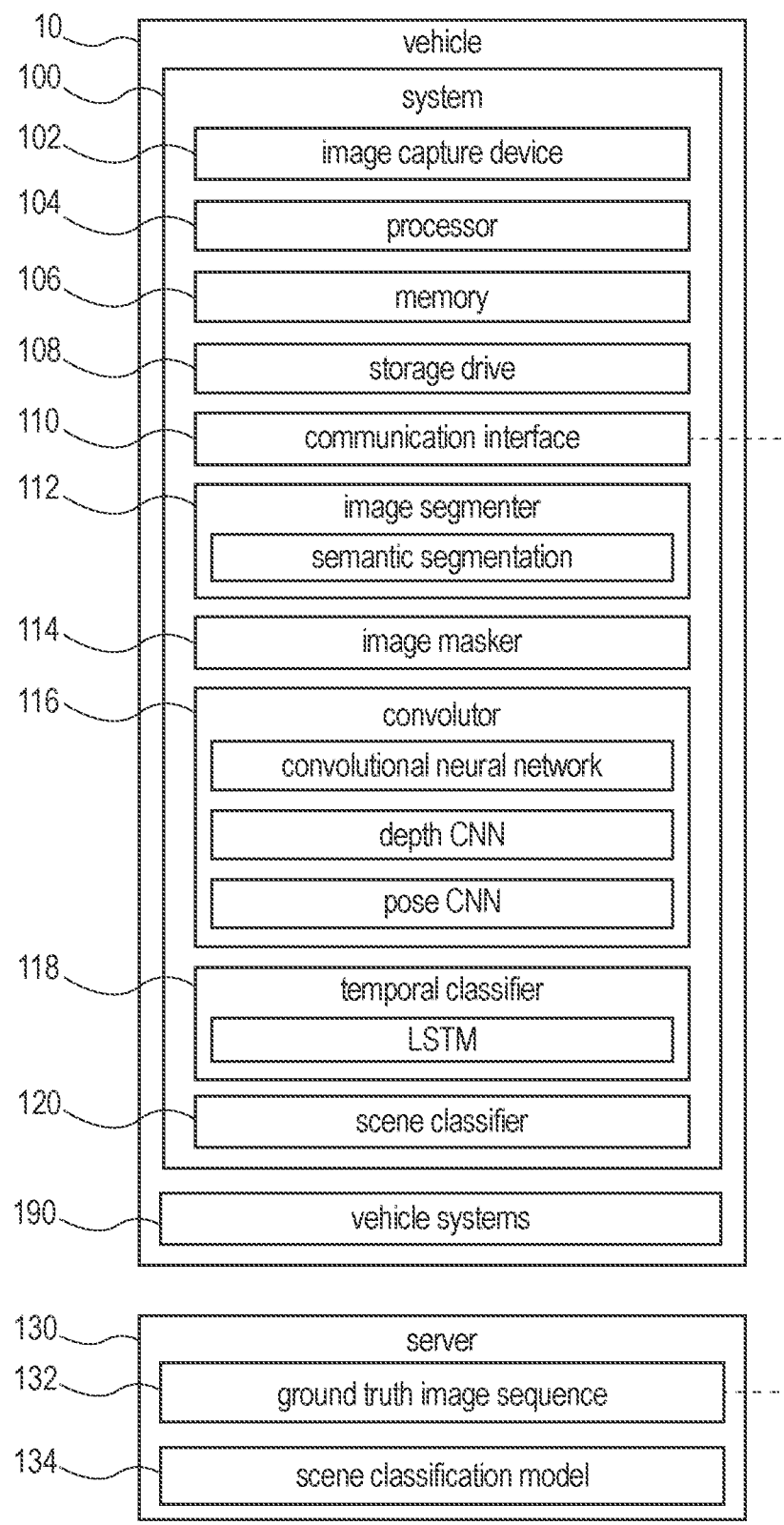
FIG. 1 is a component diagram of a system for scene classification, according to one aspect.

The following terms are used throughout the disclosure, the definitions of which are provided herein to assist in understanding one or more aspects of the disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is a component diagram of a system for scene classification 100, according to one aspect. A vehicle 10 may be equipped with a system for scene classification 100. The system for scene classification 100 may include an image capture device 102, a processor 104, a memory 106, a storage drive 108, a communication interface 110, an image segmentation module 112, an image masker 114, a convolutor 116, a temporal classifier 118, and a scene classifier 120. The vehicle 10 may include a controller, one or more vehicle sensors, and one or more vehicle systems 190. The communication interface 110 may be in communication with a server 130. The server 130 may include a scene classification database which may include a ground truth image sequence 132 and a scene classification model 134 or scene classification policy network. According to one aspect, one or more of the image segmentation module 112, the image masker 114, the convolutor 116, the temporal classifier 118, and/or the scene classifier 120 may be implemented via the processor 104, the memory 106, the storage drive 108, etc.

Ground Truth

According to one aspect, the ground truth image sequence 132 may include a series of one or more image frames which are associated with a moving vehicle and may be collected during a training phase. It will be appreciated that some scenes may be static, while other scenes or places may be dynamic. For example, an intersection may be a static scene or place, while a construction zone may be dynamic in that the construction zone may be defined by traffic cones, which may change size, shape, appearance, and/or location between construction zones and between different days or times.

Each one of the one or more image frames of the ground truth image sequence 132 may be annotated (e.g., manually annotated and be indicative of the ground truth) with one or more labels, such as a temporal classification label, a weather classification label, a road surface classification label, an environment classification label, and a scene classification label. Examples of temporal classification labels may include background, approaching, entering, passing, etc. In other words, the image frames are annotated temporally with fine grained labels such as Approaching (A), Entering (E), and Passing (P), depending on vantage point and/or the position of the training vehicle relative position to the place of interest or scene. The classification labels may be organized in a hierarchical and in a causal manner. For example, at the top, environment may be annotated, followed by the scene classes at the mid-level, and the fine grained annotations such as approaching, entering, and passing at bottom level.

Examples of weather classification labels may include clear, sunny, snowy, rainy, overcast, cloudy, foggy, light, dark, etc. Examples of road surface classification labels may include dry, wet, snow, obscured (e.g., some traffic markings not visible), mud, etc. Examples of environment classification labels may include environment types, such as urban, country, suburban, ramp, highway, local (e.g., neighborhood, residential, school), etc. Ramps, for example, may be a connector between two highways or between a highway and another road type. Examples of scene classification labels may include road places, a construction zone, an intersection (e.g., an x-way intersection, such as a three-way, four-way, five-way, etc.), a bridge, an overhead bridge, a railroad crossing, a tunnel, lane merge, lane branch, zebra crossing, etc. Some scene classifications may merely be associated with approaching and passing temporal classification labels, while others may be associated with approaching, entering, and passing labels. The road surface classification and the weather classifications may be mutually exclusive from one another. In other words, it may be wet on the road, but the weather may be sunny, for example.

This annotated ground truth image sequence 132 may be utilized to train a model, which may be stored in the scene classification database as a scene classification model 134 or a scene classification policy network, for example. Because the ground truth image sequence 132 is annotated as desired (e.g., this may be performed manually, by humans), the scene classification model 134 may be trained via machine learning, deep learning, or other type of artificial intelligence technique. In this regard, the system for scene classification 100 may be trained (e.g., via the processor 104) to mimic results from the ground truth image sequence 132 by minimizing losses and by backpropagation.

Image Capture

The image capture device 102 may capture a first series of image frames (e.g., video) of an environment (e.g., operating environment) from the perspective of a moving vehicle. According to one aspect, this first series of image frames or video of the environment may be taken as an input to the system for scene classification 100.

Segmentation

The image segmentation module 112 may identify one or more traffic participants within the environment from the image frames based on a first convolutional neural network (CNN) and the first series of image frames. According to one aspect, the image segmentation module 112 may implement a deeplab CNN. Regardless of implementation, the image segmentation module 112 may provide semantics segmentation as an output when the input of the series of image frames is provided. The image segmentation module 112 may classify objects within each image frame of the first series of image frames. For example, the image segmentation module 112 may identify one or more pedestrians, one or more vehicles (e.g., in traffic), one or more motorists, one or more bystanders, one or more bicyclists, one or more moving objects, etc.

Masking

The image masker 114 may generate a second series of image frames by masking one or more of the traffic participants from the environment. Because traffic participants generally have no bearing on how a scene is defined (e.g., whether the environment is an intersection, a highway, etc.), the image masker 114 may mask all of the traffic participants from the environment from the second series of image frames. According to one aspect, the image masker 114 may utilize semantic segmentation to mask one or more of the traffic participants from the image frame sequence. According to one aspect, the image masker 114 may also mask other unnecessary objects from the environment, such as birds in the sky, etc. In this way, the image masker 114 may provide the system for scene classification 100 with greater spatial hard attention by allowing neural networks of the system for scene classification 100 focus on the unmasked portions of the image frames, thereby providing greater accuracy during classification. Thus, semantic context may be provided via the image masker 114 and the image segmentation module 112.

Temporal Classification

The temporal classifier 118 may classify one or more image frames of the second series of image frames (e.g., or from the original set of image frames captured by the image capture device 102) with one of two or more temporal predictions and generate a third series of image frames associated with respective temporal predictions based on a scene classification model 134. Examples of temporal predictions may include, background, approaching, entering, passing of a scene or a place, etc. The temporal classifier 118 may learn that approaching is generally followed by entering, and then by passing.

According to one aspect, the temporal classifier 118 may perform classification based on a second CNN, a long short-term memory (LSTM) network, and a first fully connected layer on an input set of image frames, which may be the original input image frames (RGB), image frames concatenated with semantic segmentation (RGBS), image frames with traffic participants masked using semantic segmentation (RGB-masked), or merely using a one channel semantic segmentation image (S). In this way, the temporal classifier 118 may be utilized to determine where within a scene, the vehicle 10 is located (e.g., on a frame by frame basis). According to one aspect, the second CNN may be implemented as ResNet 50, for example. The temporal classifier 118 may determine and assign one or more of the temporal predictions to one or more corresponding image frames of the first series of image frames or one or more corresponding image frames of the second series of image frames prior to any determination by the scene classifier 120 regarding the type of scene or place.

The temporal classifier 118, when performing classification based on any CNN, may implement the convolutor 116, and pass an input through one or more of the CNNs of the convolutor, such as a CNN, a depth CNN, a pose CNN, etc. to generate an output.

In other words, the temporal classifier 118 may determine the beginning, middle, and/or end of a scene before determining what type of scene the scene actually is or prior to determining the associated scene prediction for the scene. Stated yet another way, the temporal classifier 118 may enable the system for scene classification 100 to distinguish between different stages of an event, such as when the vehicle 10 passes through an intersection or a construction zone. Specifically, the temporal classifier 118 may label, assign, or annotate one or more image frames of one or more of the series of images with a temporal prediction from a set of temporal predictions. As previously discussed, examples of these temporal predictions may include background, approaching, entering, or passing of a scene or a place. In this way, fine grain or fine-tuned temporal classification may be provided by the temporal classifier 118 (e.g., to localize the vehicle 10 within a specific, unknown scene or place). It will be appreciated that other temporal predictions may be utilized according to other aspects. For example, the temporal prediction may be numerical and be indicative of progress through a scene (e.g., which may yet to be defined by the scene classifier 120). Regardless, the ground truth image sequence 132 may be utilized to train a classifier, such as the temporal classifier 118, to detect when the vehicle 10 is approaching, entering, or passing a scene, regardless of whether the type of scene is known.

Weather Classification

The scene classifier 120 may utilize the scene classification model 134, which may be trained on a CNN, such as ResNet 50 or a deepnet CNN, to determine the weather classification for the vehicle 10. Similarly to scene classification, weather, road surface, and environment, may be classified using an input where the traffic participants are masked (e.g., using the image masker 114 generated series of image frames which mask one or more of the traffic participants from the environment). However, other inputs may be provided, such as the original input image frames (RGB), image frames concatenated with semantic segmentation (RGBS), image frames with traffic participants masked using semantic segmentation (RGB-masked), or merely using a one channel semantic segmentation image (S). The scene classification model 134 may be trained based on the annotated ground truth image sequence 132. Examples of weather classification labels may include lighting conditions, visibility conditions, such as clear, sunny, snowy, rainy, overcast, cloudy, foggy, light, dark, etc.

Road Surface Classification

The scene classifier 120 may utilize the scene classification model 134, which may have been trained on a CNN, such as ResNet 50, to determine the road surface classification for the vehicle 10. The scene classification model 134 may be trained based on the ground truth image sequence 132, which may be annotated with one or more labels for each of the associated image frames, as described above. Examples of road surface classification labels may include dry, wet, snow, obscured (e.g., some traffic markings not visible), mud, etc.

Environment Classification

The scene classifier 120 may operate similarly to the other types of classifications. Examples of environment classification labels may include environment types, such as urban, country, suburban, ramp, highway, local (e.g., neighborhood, residential, school), etc.

Scene or Place Classification

The scene classifier 120 may classify one or more image frames of the third series of image frames based on a third CNN, global average pooling, and a second fully connected layer and generate an associated scene prediction based on the scene classification model 134 and respective temporal predictions. The scene classifier 120 may generate a fourth series of image frames associated with respective temporal predictions based on the scene classification model 134 and respective temporal predictions. In this way, the temporal classifier 118 may be utilized to trim image frames from the video or from the image sequences to enable efficient scene classification to occur. Stated another way, the scene classifier 120 may merely consider image frames marked as approaching, entering, and passing of a given environment place, while ignoring image frames annotated as background, and thus provide dynamic classification of road scenes, for example. In this way, this two-stage architecture mitigates the unnecessary use of processing power, by excluding background image frames from being examined and/or scene classified. Thus, the temporal classifier 118 acts as a coarse separator for the scene classifier 120, mitigating the amount of processing power and resources utilized to classify scenes, and sending merely the candidate frames of approaching, entering, or passing to the scene classifier 120 as an event window to the prediction network.

The scene classifier 120, similarly to the temporal classifier 118, when performing classification based on any CNN, may implement the convolutor 116, and pass an input through one or more of the CNNs of the convolutor, such as a CNN, a depth CNN, a pose CNN, ResNet 50 CNN, etc. to generate an output.

According to one aspect, the third CNN may be implemented as ResNet 50, for example. Therefore, the scene classifier 120 may utilize one or more of the temporal predictions from one or more of the corresponding image frames to facilitate determination of what type of scene or place is associated with the approaching, entering, and passing of a scene. For example, the temporal classifier 118 may have classified one or more image frames of the series of image frames with temporal predictions. Using these temporal predictions, the scene classifier 120 may determine that a set of image frames associated with approaching, entering, and passing of a scene from the series of image frames is a construction zone, for example. Thus, the temporal classifier 118 may determine that the vehicle 10 is travelling through a beginning, middle, and end of an unknown type of scene, and the scene classifier 120 may determine what type of scene the scene is after the temporal classifier 118 has made or determined its temporal predictions of the image frames.

Examples of scene or place classifications may include road places, such as a construction zone, an intersection (e.g., an x-way intersection, such as a three-way, four-way, five-way, etc.), a bridge, an overhead bridge, a railroad crossing, a tunnel, lane merge, lane branch, zebra crossing, etc. In this way, the scene prediction may a scene classification indicative of a type of location where the vehicle 10 is approaching, entering, or passing, for example.

According to one aspect, the scene classifier 120 may generate the scene prediction based on the input of first series of image frames, in real time, and such that a complete series of image frames temporally annotated from background, approaching, entering, passing is not necessarily required to generate the scene prediction. In other words, merely a partial series of image frames may be assigned temporal predictions (e.g., background, approaching, . . . , etc.) prior to the scene classifier 120 generating the associated scene prediction based on the CNN, the global average pooling, and respective temporal predictions. Thus, development of machine learning that utilizes the semantic context and temporal nature of the ground truth dataset may improve classification results for the system for scene classification 100.

Vehicle Application

The controller may activate or deactivate one or more sensors or one or more vehicle systems 190 of the vehicle 10 based on the scene prediction and/or one or more of the classifications, such as the weather classification, the road surface classification, the environment classification, etc. For example, because scene context features may serve as a prior for other down-stream tasks such as recognition of objects, behavior, action, intention, navigation, localization, etc., the controller of the vehicle 10 may react based on the scene prediction determined by the scene classifier 120, as well as the other classifications, including the weather classification, the road surface classification, and the environment classification.

For example, if the scene classifier 120 determines the scene prediction to be a crosswalk, the controller of the vehicle 10 may activate additional sensors to detect pedestrians. At other times, such as when the vehicle 10 is on the highway, the pedestrian sensors may be prioritized lower. As another example, if the scene classifier 120 determines the scene prediction to be an intersection, the controller of the vehicle 10 may activate additional sensors or run specific modules to detect traffic lights, stop signs, stop lines, or other intersection related information. In other words, the controller may reprioritize or highly prioritize searching for traffic lights, stop signs, stop lines based on the scene prediction being an intersection. Conversely, the controller may deactivate a LIDAR system or a radar system based on the scene prediction being a tunnel.

According to one aspect, the scene classifier 120 determines the scene prediction to be a construction zone, the controller of the vehicle (e.g., implemented via the processor 104) may warn or provide notifications and/or disable autonomous driving based on the scene prediction being the construction zone because autonomous vehicles may utilize pre-built, high definition maps of a roadway. If the scene classifier 120 determines that it is foggy or rainy out, the processor 104 may disable the LIDAR from one or more of the vehicle systems 190 to mitigate ghosting effects. When the scene classifier 120 determines that the vehicle scene prediction is in a tunnel, or that there is an overhead bridge, GPS of the vehicle systems 190 may be deprioritized because GPS may lose tracking from the tunnel or the overhead bridge. Further, cameras may be prepped for extreme exposure when exiting the tunnel or overhead bridge area. Similarly, a lane departure warning system may be implemented with wider tolerances or disabled when the scene classifier 120 determines the scene prediction to be a branch area or near an exit ramp, for example. Therefore, the scene classifier 120 may be utilized to enhance the use of one or more of the vehicle systems 190, such as by activating, deactivating, prioritizing, deprioritizing, etc. one or more of the respective vehicle systems 190. In this way, the scene classifier 120 may provide contextual cues for other vehicle systems 190 of the vehicle 10 to operate efficiently.

Figure 2:
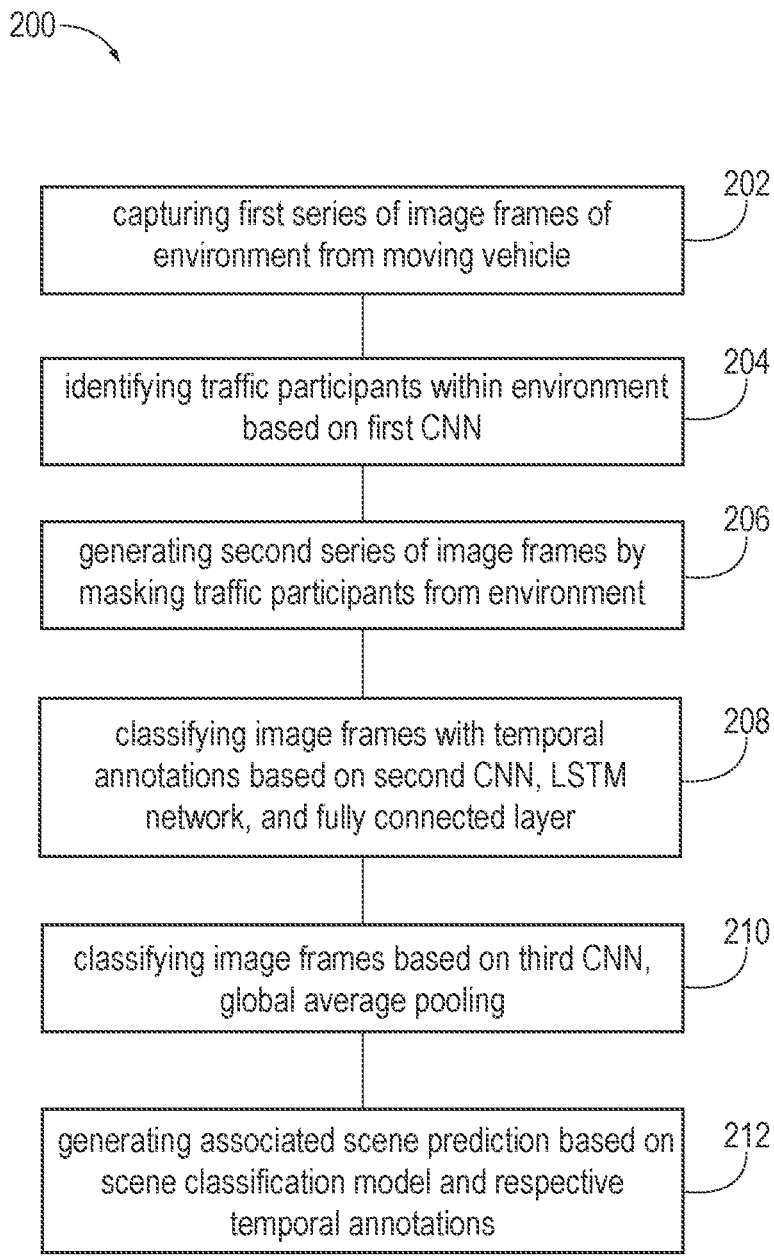
FIG. 2 is a flow diagram of a method for scene classification, according to one aspect.

FIG. 2 is a flow diagram of a method 200 for scene classification, according to one aspect. The method 200 for scene classification may include capturing 202 a first series of image frames of an environment from a moving vehicle, identifying 204 traffic participants within the environment based on a first CNN, generating 206 a second series of image frames by masking traffic participants from the environment, classifying 208 image frames of the second series of image frames with temporal predictions based on a second CNN, a long short-term memory (LSTM) network, and a first fully connected layer, classifying 210 image frames based on a third CNN, global average pooling, and a second fully connected layer, and generating 212 an associated scene prediction based on the scene classification model 134 and respective temporal predictions.

Figure 3:
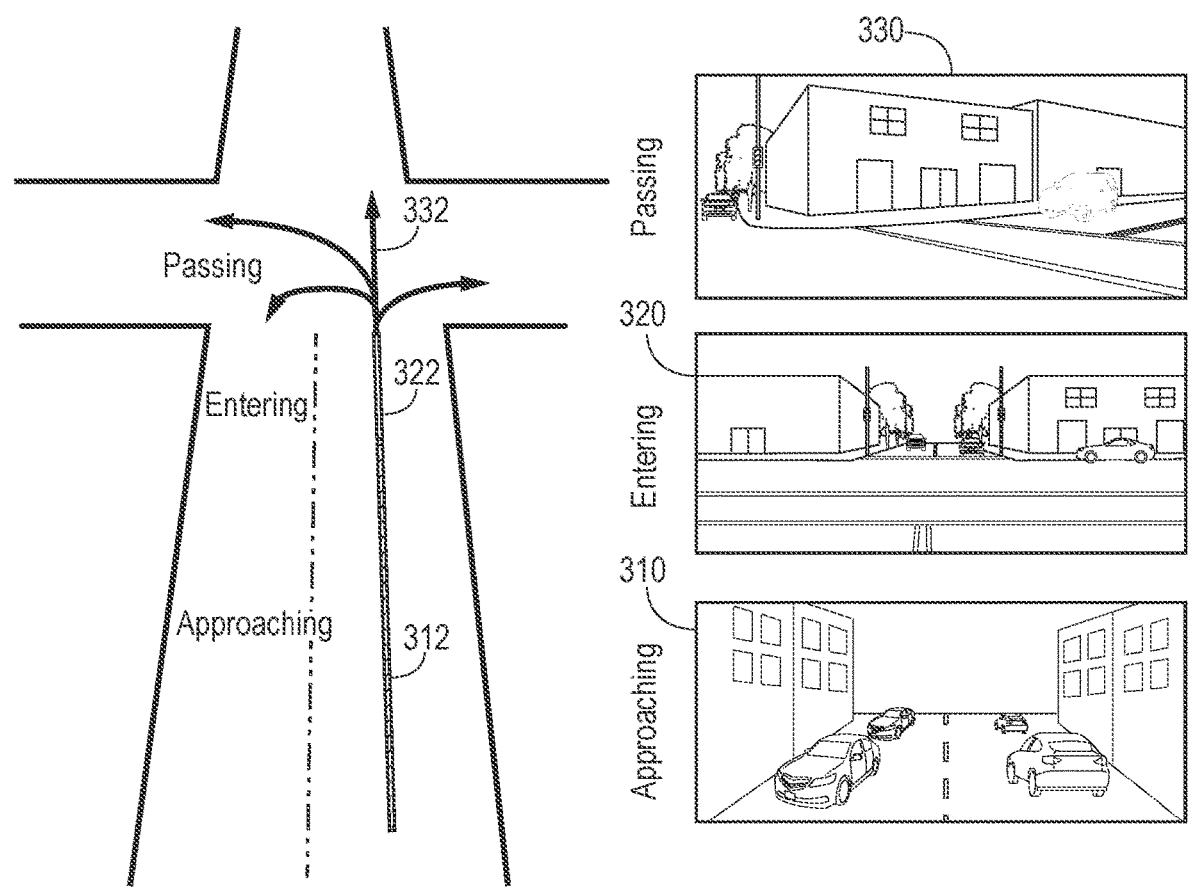
FIG. 3 is an exemplary diagram of temporal predictions or predictions associated with a scene classification, according to one aspect.

FIG. 3 is an exemplary diagram of temporal predictions associated with a scene classification, according to one aspect. In FIG. 3, different image frames captured by the image capture device 102 may be labelled in association with the ground truth image sequence 132. For example, a first image frame 310 may be labelled as an approaching image frame, a second image frame 320 may be labelled as an entering image frame, and a third image frame 330 may be labelled as a passing image frame. This approaching, entering, and passing may correspond with the vehicle 10 approaching 312, entering 322, and passing 332 an intersection, as seen in FIG. 3.

While FIG. 3 depicts the approaching, entering, and passing for the intersection scene type, other types of scenes may be annotated in a similar fashion (e.g., including temporal predictions of approaching, entering, and passing and also including other annotations, such as scene type annotations of an intersection, a bridge, a tunnel, etc.). It will be appreciated that the ground truth image sequence 132 and the captured series of image frames from the image capture device 102 may be from the perspective of a moving vehicle, and thus, the image frames are not from the perspective of a static or stationary camera. In other words, the ground truth image sequence 132 and the captured series of image frames may include space-time variations in viewpoint and/or scene appearance. As seen in FIG. 3, view variations may be caused by the changing distance to the intersection as the vehicle 10 approaches the scene of interest (i.e. the intersection at the passing 332).

Figure 4A:
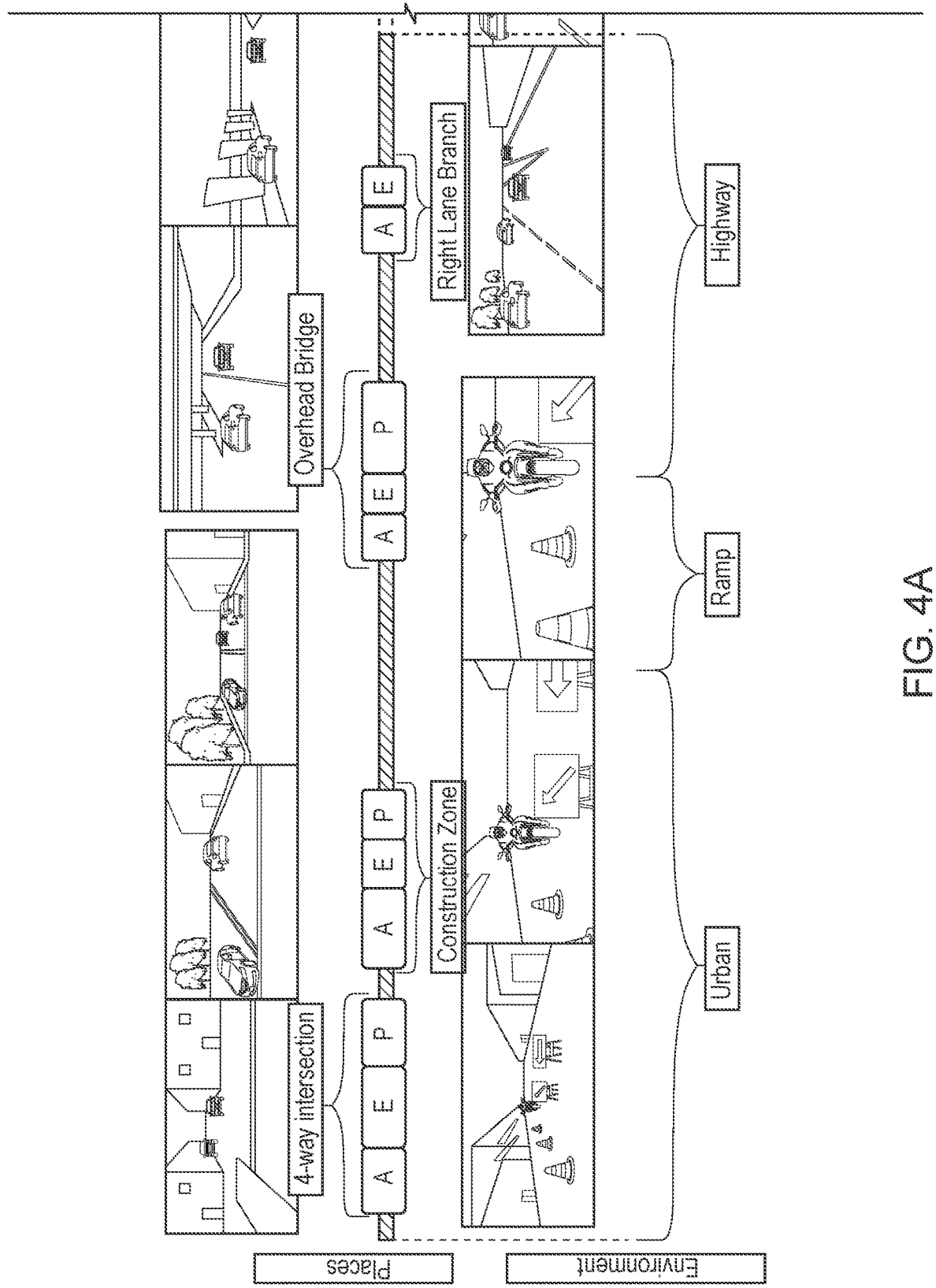
FIGS. 4A-4B are exemplary diagrams of temporal predictions or predictions associated with various scene classifications, according to one aspect.
Figure 4B:
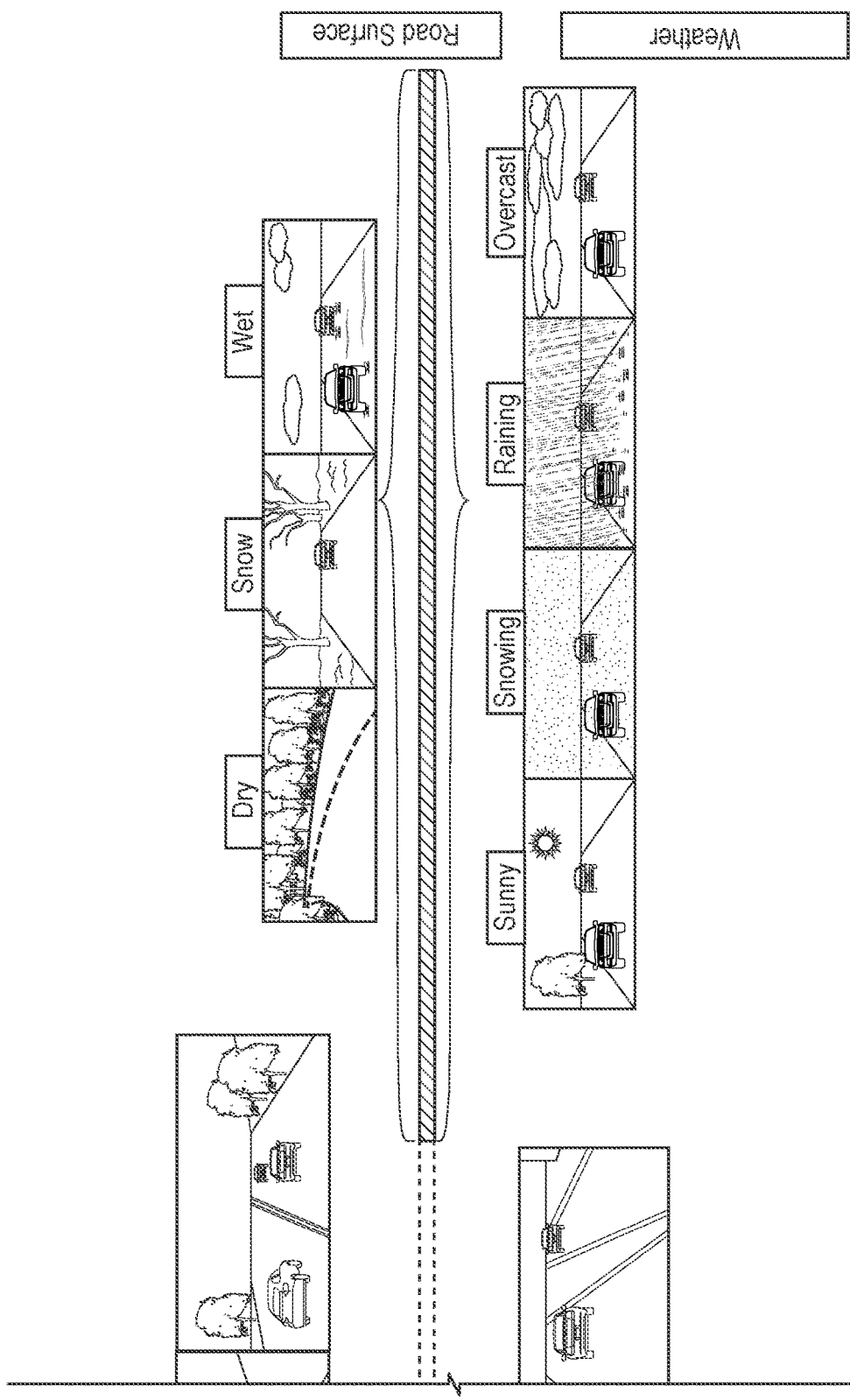

FIGS. 4A-4B are exemplary diagrams of temporal predictions associated with various scene classifications, according to one aspect. In FIGS. 4A-4B, different examples of a variety of annotations are provided. According to one aspect, one or more CNNs or other networks may be implemented to make parameters fed through the architecture of FIGS. 4A-4B tractable.

Figure 5:
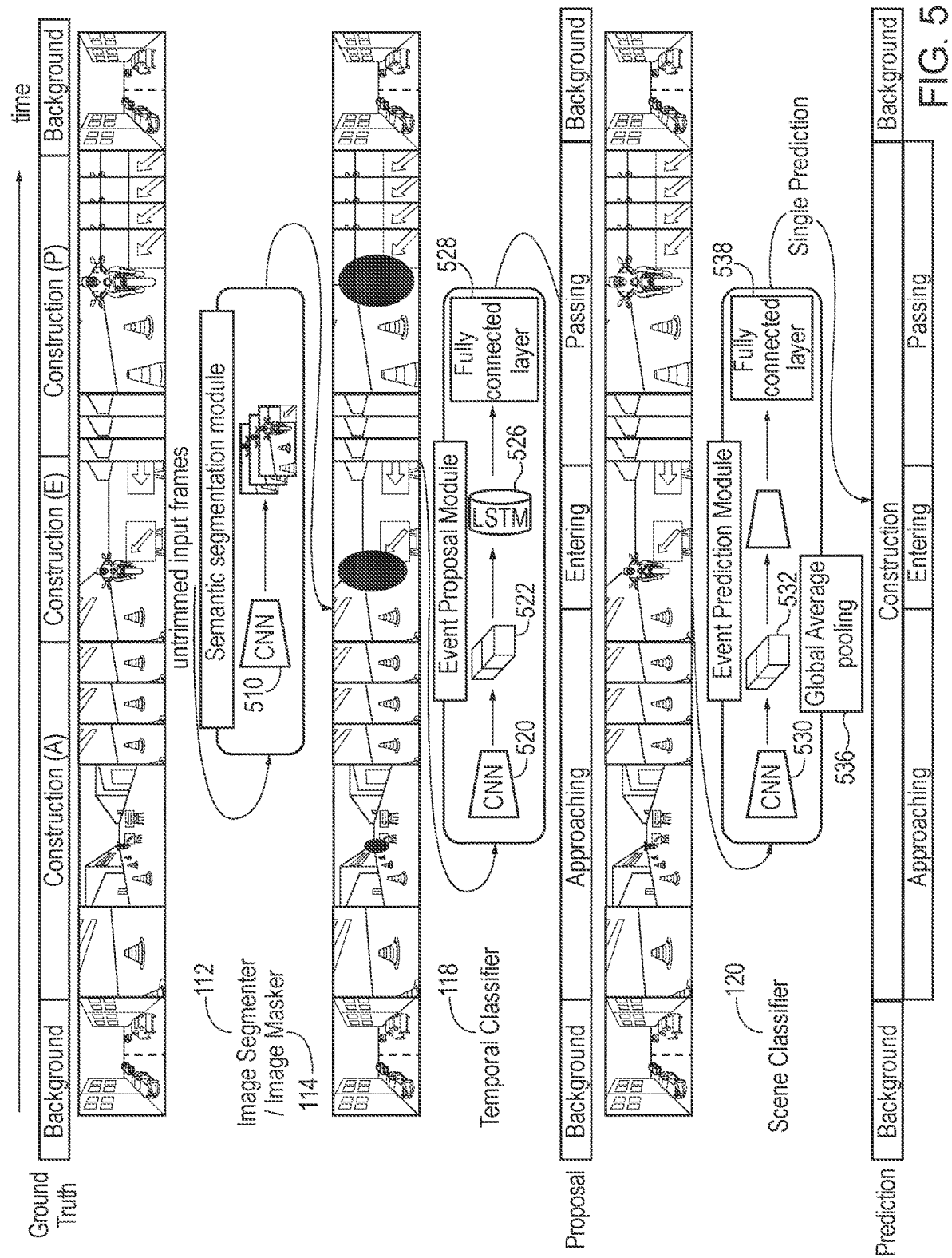
FIG. 5 is an exemplary diagram of an architecture associated with training the system for scene classification of FIG. 1.

FIG. 5 is an exemplary diagram of an architecture associated with training the system for scene classification 100 of FIG. 1. The ground truth image sequence 132 may be annotated to include the scene classifications label of 'construction' and each one of the image frames of the input series of image frames of the construction environment may be annotated with temporal predictions indicative of where the moving vehicle is within the construction zone. In other words, the temporal predictions of the ground truth image sequence 132 may be marked as approaching, entering, or passing, for example.

The image capture device 102 may capture an input series of image frames. The image segmentation module 112 may segment or identify one or more traffic participants using semantic segmentation, such as via a CNN 510 (e.g., a deeplab CNN). The image masker 114 may mask one or more of the traffic participants from the image frames, thereby enabling the system for scene classification 100 to focus merely on the surrounding environment and provide more accurate scene classification accordingly.

As seen in FIG. 5, the temporal classifier 118 may be utilized to trim untrimmed video and aggregate the features to classify the entire trimmed segment. For example, it may be beneficial to analyze or determine a class as a 4-way intersection by looking at or examining a segment (e.g., approaching, entering, and passing) in its entirety rather than on a per frame basis. Here, the temporal classifier 118 may be fed the series of image frames which have the traffic participants masked (e.g., the RGB-masked image frames). According to other aspects or architectures, the temporal classifier 118 may receive other series of image frames, such as the RGB, RGBS, or S image frames. In any event, the temporal classifier 118 may receive the input set of image frames and feed this through a CNN 520, such as the ResNet 50 CNN, extract a set of features 522, feed this set of features through an LSTM 526 and a fully connected layer 528, thereby producing a series of image frames, each annotated with temporal predictions.

The series of image frames annotated with temporal predictions may be fed to the scene classifier 120, which may include one or more CNNs 530, such as the ResNet 50 CNN, extract a set of features 532, perform global average pooling 536, and feed the results through a fully connected layer 538 to generate a scene prediction for the scene (e.g., which may be unknown up to this point) including image frames annotated as approaching, entering, and passing. This model may be trained based on the ground truth image sequence 132. In other words, the temporal classifier 118 and the scene classifier 120 may be trained using machine learning or deep learning to replicate or mimic the annotations of the ground truth image sequence 132, such as when a similar unannotated series of image frames is provided to the system for scene classification 100, thereby building a scene classification model 134 or scene classification policy network stored within the scene classification database on the server 130.

The scene classifier 120 may aggregate frames within this window through global average pooling and produce a singular class label for the entire event, place, or scene. According to one aspect, one or more of the CNNs described herein may be pre-trained on the ground truth image sequence 132 or another database from the scene classification database. Data augmentation may be performed to reduce over-fitting. Random flips, random resize, and random crop may be employed. As indicated, the processor 104 or the controller of the vehicle 10 may make adjustments for one or more vehicle systems 190 based on the generated scene prediction.

Figure 6:
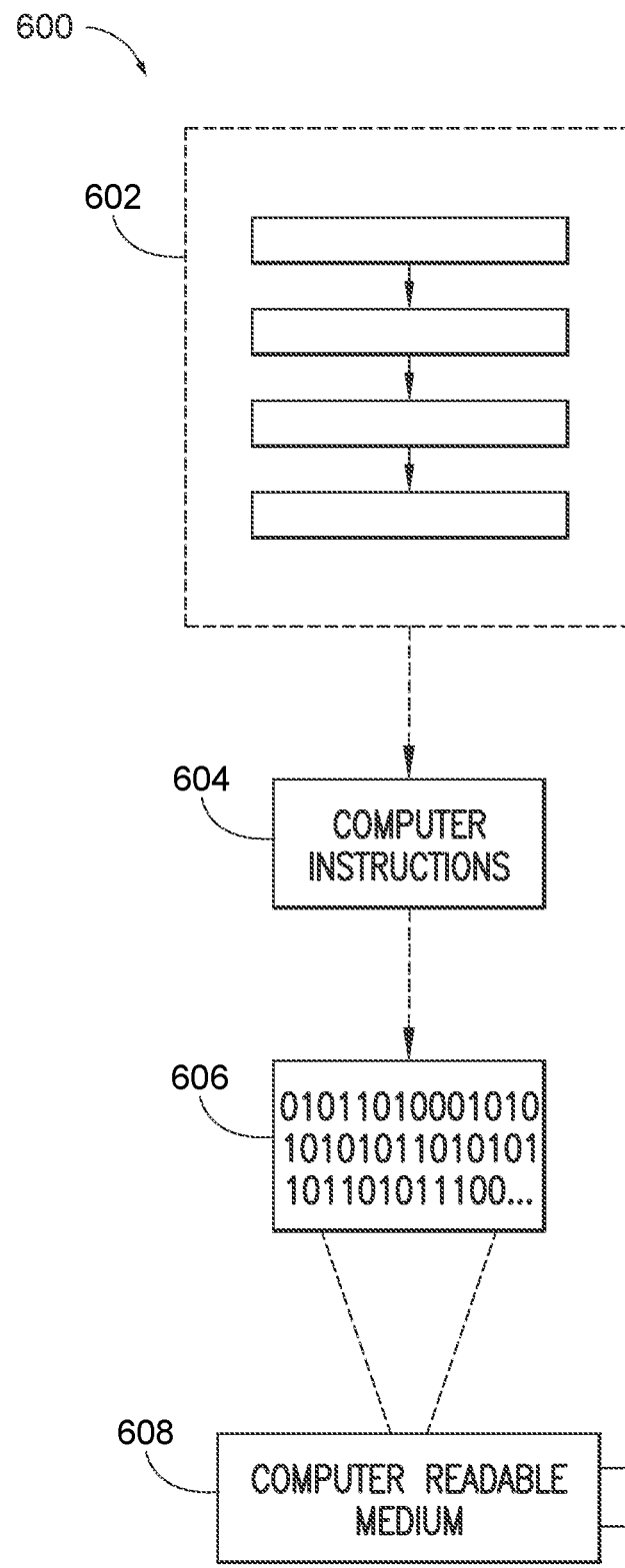
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 200 of FIG. 2. In another aspect, the processor-executable computer instructions 604 may be configured to implement a system, such as the system for scene classification 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
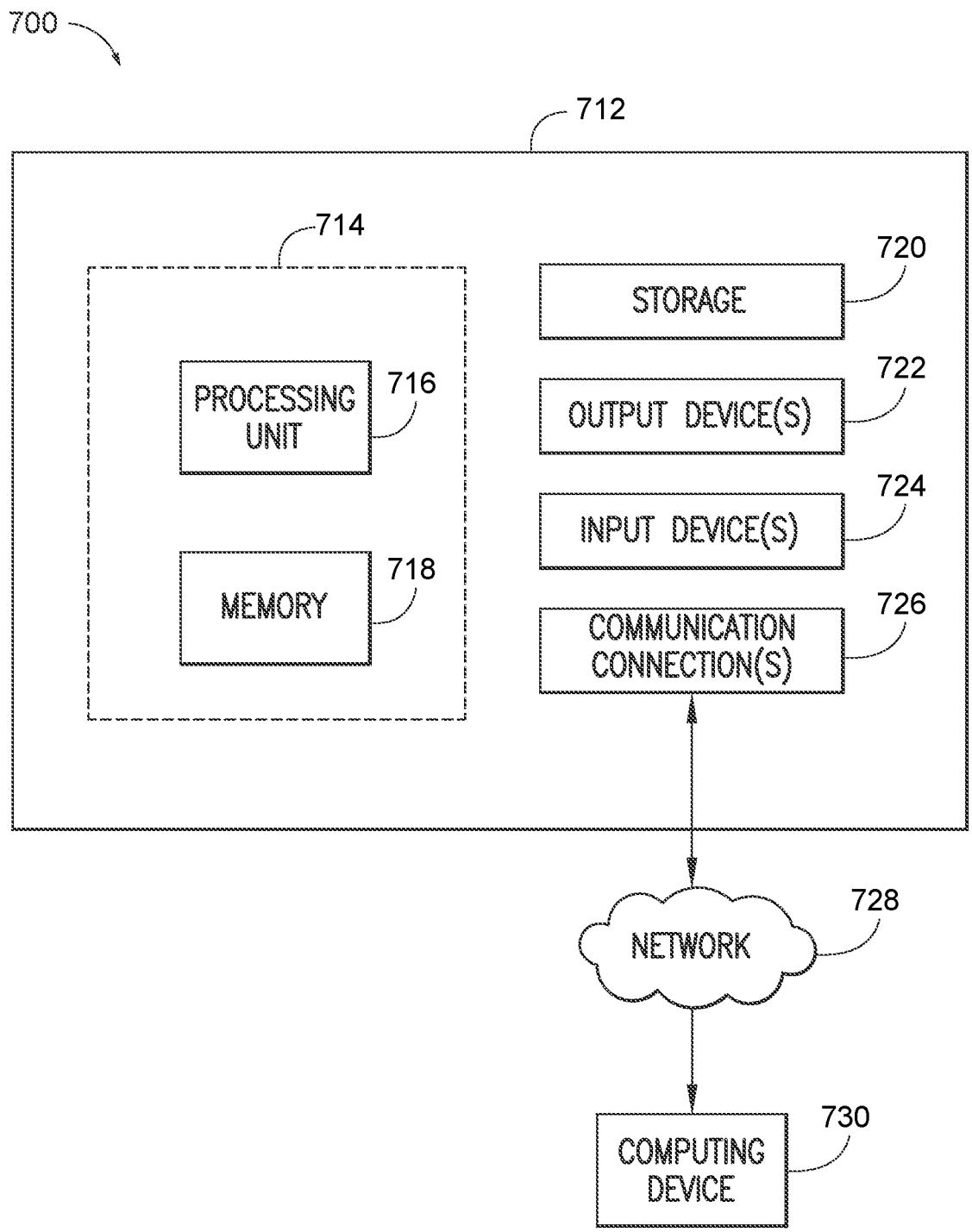
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for scene classification, comprising:
an image capture device capturing a first series of image frames of an environment from a moving vehicle;
an image segmentation module identifying one or more traffic participants within the environment based on a first convolutional neural network (CNN);
an image masker generating a second series of image frames by masking one or more of the traffic participants from the environment;
a temporal classifier classifying one or more image frames of the second series of image frames with one of two or more temporal predictions and generating a third series of image frames associated with respective temporal predictions based on a scene classification model, wherein the classifying of one or more of the image frames is based on a second CNN, a long short-term memory (LSTM) network, and a first fully connected layer; and
a scene classifier classifying one or more image frames of the third series of image frames based on a third CNN, global average pooling, and a second fully connected layer and generating an associated scene prediction based on the scene classification model and respective temporal predictions,
wherein the first CNN, the second CNN, or the third CNN is a deepnet CNN or a ResNet 50 CNN.

2. The system for scene classification of claim 1, wherein the two or more temporal predictions include an approaching annotation, an entering annotation, and a passing annotation.

3. The system for scene classification of claim 1, wherein the system for scene classification is implemented in a vehicle and the vehicle includes a controller activating or deactivating one or more sensors or one or more vehicle systems of the vehicle based on the scene prediction.

4. The system for scene classification of claim 3, wherein the scene classifier classifies one or more image frames of the third series of image frames with a weather classification including clear, sunny, snowy, rainy, overcast, or foggy; and
wherein the controller activates or deactivates one or more of the sensors or one or more of the vehicle systems of the vehicle based on the weather classification.

5. The system for scene classification of claim 3, wherein the scene classifier classifies one or more image frames of the third series of image frames with a road surface classification including dry, wet, or snow; and
wherein the controller activates or deactivates one or more of the sensors or one or more of the vehicle systems of the vehicle based on the road surface classification.

6. The system for scene classification of claim 3, wherein the scene classifier classifies one or more image frames of the third series of image frames with an environment classification including urban, ramp, highway, or local; and
wherein the controller activates or deactivates one or more of the sensors or one or more of the vehicle systems of the vehicle based on the environment classification.

7. The system for scene classification of claim 3, wherein one or more of the vehicle systems is a LIDAR system or radar system.

8. The system for scene classification of claim 7, wherein the controller deactivates the LIDAR system or radar system based on the scene prediction being a tunnel.

9. The system for scene classification of claim 3, wherein the controller prioritizes searching for traffic lights, stop signs, stop lines based on the scene prediction being an intersection.

10. A vehicle equipped with a system for scene classification, comprising:
an image capture device capturing a first series of image frames of an environment from a moving vehicle;
an image segmentation module identifying one or more traffic participants within the environment based on a first convolutional neural network (CNN);
an image masker generating a second series of image frames by masking one or more of the traffic participants from the environment;
a temporal classifier classifying one or more image frames of the second series of image frames with one of two or more temporal predictions and generating a third series of image frames associated with respective temporal predictions based on a scene classification model, wherein the classifying of one or more of the image frames is based on a second CNN, a long short-term memory (LSTM) network, and a first fully connected layer; and
a scene classifier classifying one or more image frames of the third series of image frames based on a third CNN, global average pooling, and a second fully connected layer and generating an associated scene prediction based on the scene classification model and respective temporal predictions; and
a controller activating or deactivating one or more sensors or one or more vehicle systems of the vehicle based on the scene prediction,
wherein the first CNN, the second CNN, or the third CNN is a deepnet CNN or a ResNet 50 CNN.

11. The vehicle of claim 10, wherein the two or more temporal predictions include an approaching annotation, an entering annotation, and a passing annotation.

12. The vehicle of claim 10, wherein one or more of the vehicle systems is a LIDAR system or radar system and wherein the controller deactivates the LIDAR system or radar system based on the scene prediction being a tunnel.

13. A system for scene classification, comprising:
an image capture device capturing a first series of image frames of an environment from a moving vehicle;
a temporal classifier classifying one or more image frames of the first series of image frames with one of two or more temporal predictions and generating a second series of image frames associated with respective temporal predictions based on a scene classification model, wherein the classifying of one or more of the image frames is based on a convolutional neural network (CNN), a long short-term memory (LSTM) network, and a first fully connected layer; and
a scene classifier classifying one or more image frames of the second series of image frames based on a second CNN, global average pooling, and a second fully connected layer and generating an associated scene prediction based on the scene classification model and respective temporal predictions,
wherein the CNN or the second CNN is a ResNet 50 CNN.

14. The system for scene classification of claim 13, wherein the two or more temporal predictions include an approaching annotation, an entering annotation, and a passing annotation.

15. The system for scene classification of claim 13, wherein the system for scene classification is implemented in a vehicle and the vehicle includes a controller activating or deactivating one or more sensors or one or more vehicle systems of the vehicle based on the scene prediction.

16. The system for scene classification of claim 15, wherein the scene classifier classifies one or more image frames of the third series of image frames with a weather classification including clear, sunny, snowy, rainy, overcast, or foggy; and wherein the controller activates or deactivates one or more of the sensors or one or more of the vehicle systems of the vehicle based on the weather classification.

17. The system for scene classification of claim 15, wherein the scene classifier classifies one or more image frames of the third series of image frames with a road surface classification including dry, wet, or snow; and wherein the controller activates or deactivates one or more of the sensors or one or more of the vehicle systems of the vehicle based on the road surface classification.

* * * * *